United States Patent [19]

Harkness

[11] Patent Number: 4,494,064
[45] Date of Patent: Jan. 15, 1985

[54] DIRECT CURRENT INRUSH LIMITING CIRCUIT

[75] Inventor: John C. Harkness, 2006 Wellesley, St. Paul, Minn. 55105

[73] Assignee: Sperry Corporation, New York, N.Y.

[21] Appl. No.: 436,550

[22] Filed: Oct. 25, 1982

[51] Int. Cl.³ ............................................. G05F 1/44
[52] U.S. Cl. .................................... 323/277; 323/282; 323/303; 323/908
[58] Field of Search ............... 323/273, 276, 277, 282, 323/288, 303, 901, 908

[56] References Cited

U.S. PATENT DOCUMENTS

| | | | |
|---|---|---|---|
| 3,733,540 | 5/1973 | Hawkins | 363/89 |
| 3,959,714 | 5/1976 | Mihelich | 323/288 |
| 4,195,335 | 3/1980 | Murakami et al. | 323/901 X |
| 4,307,440 | 12/1981 | Inoue et al. | 323/901 X |

OTHER PUBLICATIONS

*IBM Technical Disclosure Bulletin*, "Power Supply Output Over-Current Protection", M. Dye and P. J. Murset, vol. 24, No. 5, Oct. 1981, p. 2435.

*Primary Examiner*—William M. Shoop
*Attorney, Agent, or Firm*—William C. Fuess; Kenneth T. Grace; Marshall M. Truex

[57] ABSTRACT

Direct current inrush upon connection of a capacitive load to a d.c. voltage is limited through an intermediary circuit. Within such circuit the inrush current is sensed by a series resistance and such sensing is utilized via a feedback loop, to control a series current regulating transistor to be cyclically conducting or non-conducting of a first direct current path. A second direct current path through freewheeling diodes flows current to the load only when such series current regulating transistor is non-conducting of such first path current. After fully charging the capacitive load, howsoever slowly as desired, the first current path conducts with low power dissipation while the second current path is non-conducting. The circuit is further controlled to be correctly operative for control of inrush current during the turn-on, or disruption of, fundamental power to such circuit.

8 Claims, 8 Drawing Figures

| REFERENCE | QUANTITY | DESCRIPTION |
|---|---|---|
| Q101 | 1 | 300V, 50A NPN TYPE SDT96306 |
| Q102, Q103 | 2 | NPN TYPE 2N2222A |
| CR100 | | 300V, 5A |
| CR102, CR103 | 2 | 300V, 5A FAST |
| U101 | 1 | SUPERVISORY CHIP TYPE SG1544 |
| U102 | 1 | DRIVER CHIP TYPE SG1627 |
| U103 | 1 | OP. AMP. AND REFERENCE TYPE LM10 |
| R104 | 1 | 20M OHMS, 3% 2W |
| R105 | 1 | 2K OHMS 2% .125W |
| R106, R108 | 1 | 560 OHMS, 1% .05W |
| R107 | 1 | 15K OHMS 1% .05W (FOR 4AMP LEVEL), OR 22.6K OHMS 1% .05W (FOR 2.5AMP LEVEL) |
| R109 | 1 | 82K OHMS 1% .05W |
| R110 | 1 | 1K OHMS 2% .125W |
| R111, R117 | 2 | 510 OHMS, 2% .125W |
| R112, R113 | 2 | 1.4 OHMS, 1% 1W WIREWOUND |
| R114 | 1 | 200 OHMS 2% 1/4W |
| R115 | 1 | 14 OHMS 1% 2W WIREWOUND |
| R116 | 1 | 5.1K OHMS 1% .05W |
| R118 | 1 | 14K OHMS 1% .05W |
| R119 | 1 | 116 OHMS, 1% .05W |
| R120 | 1 | .5 OHMS, 1% 1W WIREWOUND |
| C101 | 1 | 2700 PF 10% 50V |
| C103 | 1 | .47 MF 20% 50V |
| C105 | 1 | .12 MF 10% 400V |
| C109 | 1 | 100 PF 20% 50V |
| C110 | 1 | 82 MF 10V ELECTROLYTIC |

FIG. 2

DIRECT CURRENT INRUSH LIMITING CIRCUIT

The present invention was developed under contract N00024-80-C-7359 of the U.S. Department of the Navy.

BACKGROUND OF THE INVENTION

The present invention relates generally to preventing inrush current upon the connection of a load to a power supply. The present invention more specifically relates to the prevention of inrush current upon the connection of a power supply module to a D.C. voltage, such inrush current as causes arcing, stresses components, and perturbs the input voltage distribution bus when unlimited in inrush. Also specifically, the present invention of a direct current inrush limiting circuit will prevent over-current flow from a distribution bus to a shorted load (such as a shorted power supply module), such over-current as may result in catastrophic failure of load circuitry and/or potential disruption of the distribution bus.

Diverse power-supply protection circuits exist for the prevention of damage to loads and power supply regardless of where failures originate. Practical designs usually group several of these circuits together as a dependable barrier against shorts, over-voltage, reverse voltage, and overload such as could cause component breakdown or compromise system integrity without protective circuitry. A two article series referencing fifteen different protective circuits for power supplies and their loads written by Anthony Annunziato appears as "Prevent Damage to Loads and Supplies" and "Here Are More Protective Circuits" in Electronic Design 9, Apr. 29, 1971 at page 42 and Electronic Design 10, May 13, 1971 at page 64. Specific references to active inrush-current limiters are contained in articles "Soft Starting a D.C. Power Supply Improves Reliability, Efficiency" by Roger Adair appearing in EDN, May 20, 1980 at page 7-1 and in article "Designing A Low Cost Intelligent Inrush Limiter For Off-Line Converters" appearing in proceedings of Powercon7 at page F3-1. The prior art inrush current limiting circuits contained in these and other references may be categorized as follows.

As a first inrush current limiting circuit and method to be employed in a power supply connecting a distribution bus to a load, a fixed resistor may be emplaced in series with either the input D.C. or A.C. distribution bus line. Such a fixed series resistance protects against both excessive inrush current resultant from the incipient connection of the power supply and load to the distribution bus, and again excessive current due to an internal short in either the power supply or the load or both. Such a simple solution is highly inefficient, dissipating considerable power in operation, and is of limited effectiveness in controlling current transients.

As a second inrush current limiting circuit and method, still, however, utilizing only passive resistors, a plurality of such resistors may be controllably switched in and out of series with a D.C. or A.C. distribution bus input line. Such variable series resistance protects against inrush over-current and internal shorts in either the power supply or the load. Although more efficient than a fixed resistor, such switched resistance inrush limiting circuit exhibits only limited effectiveness.

A third inrush current limiting circuit and method is applicable to connect only a D.C. distribution bus to any circuit. This method employs a series connected linear limiter circuit utilizing junction transistors or field effect transistors for protection against inrush current and internal slots. Utilization of active devices in series for control of current inrush from a D.C. bus is fast and simple. However, such active series devices exhibit high power dissipation when current limiting, and are thusly suitable only for low current applications.

A fourth inrush current limiting circuit and method utilizes silicon controlled rectifiers, or TRIACS, to connect an A.C. distribution bus input line to any circuit. Such inrush limiting circuit, as taught by Adair, McLeod, and by Annunziato as example 10 and 11, are very effective in control of inrush alternating current. Such SCR or TRIACS have no direct applicability to control of direct current inrush.

A fifth inrush current limiting circuit and method, suggested by Adair in the aforereferenced article, is to employ a thermistor in series with a D.C. or A.C. input line. Such a thermistor would protect against any large current inrush due to increased resistance at high currents. Similarly to the switched resistance method, such thermistor would exhibit only modest power dissipation during quiescent operation. However, the thermistor can protect for only one current inrush until such time as it is physically cooled off. Additionally, the thermistor offers little protection during drop-out recovery because of its long thermal time constant.

A sixth type inrush current limiting circuit and method are applicable only for the control of current input to a series pass-type regulator power supply from a D.C. distribution bus. The series pass-type regulator power supply is non-switching, and therefore does not employ that large input filter capacitor which, while dampening feedback transients onto the distribution bus, is the basic cause of high inrush current in modern switched-type power supplies. Such an input capacitor to a switched-type power supply is intentionally chosen for high storage capacity and low equivalent series resistance (ESR), thereby behaving like a nearly perfect short circuit when the supply first turns on. If however, a power supply is of the less efficient (than switching) series pass regulator type, then a sixth type inrush current limiting circuit and method utilizing a linear voltage regulator may be employed for protection against inrush current and internal shorts. In such a case the efficiency of the inrush regulating circuit is submerged in the greater inefficiency of the power supply itself.

A seventh type inrush current limiting circuit and method attempts control of the switching regulator supplied from a D.C. distribution bus in a modern-type switched power supply. Such control circuits are taught by Annunziato as his examples 12 through 14. The switching regulator control accomplished provides partial protection against inrush current and internal shorts, but does not permit of, or encompass, the utilization of any capacitive input filter on the D.C. distribution bus. If a capacitive input filter were to be employed with such an inrush current limiting circuit based on control of a switching regulator, there would be no protection against the inrush current into such filter, such as is precisely the primary inrush current in most filtered, switched-type power supplies. Additionally, there is no protection accorded by a circuit controlling inrush current via control of the switching regulators for those inrushes occurring due to the turn-on of switching transistors within such switching regulators.

SUMMARY OF THE INVENTION

The present invention of a direct current inrush limiting circuit allows fine, graduated, control of inrush current and internal short such as occur in any load circuit connected by the circuit of the present invention to a D.C. distribution bus. Specifically, the present direct current inrush limiting circuit will control the inrush current to a highly capacitive load, such as a switching-type power supply module with a capacitive input filter. Upon the connection of such a capacitive load circuit through the inrush limiting circuit of the present invention to a direct current voltage distribution bus, excessive inrush current such as causing arcing, stresses components, and perturbs such distribution bus will be controlled. In order to operate with effectiveness, the present direct current inrush limiting circuit requires a small series inductance in the load circuit being connected to the D.C. distribution bus. Such an inductor, if not normally present in the input filter of the load circuit, may be considered to be part of the present direct current inrush limiting circuit.

The summary manner by which the present invention of a direct current inrush limiting circuit functions is as follows. The direct current inrush limiting circuit is positioned between a direct current voltage distribution bus and a capacitive load, which may be a switching power supply module with an input filter. The direct current inrush limiting circuit contains four essential elements. A series current regulating means (a transistor) will be controlled to regulate direct current flow from the power distribution bus to the capacitive load. A series current sensing means (a resistor) is utilized to detect excessive current flow, such as inrush current occurring upon the connection of the capacitive load. When excessive current flow is detected, feedback control loop means (a feedback loop involving discriminators and operational amplifiers) is utilized to operate the series current regulating means (the transistor) in cyclic on and off oscillation to delimit current flow until the capacitive load is charged and the current flow assumes a normal, quiescent value. During the time that the current regulating means is shut off, current flows into the inductance of the load circuit via a second current path through freewheeling diodes. Such freewheeling diodes, the fourth essential element, are nonconducting when the normal, quiescent, current flow is attained.

Correspondingly, it is a first object of the present invention that high inrush current such as causes arcing, stresses components, and perturbs the distribution bus resultant upon connection of a capacitive load to a direct current voltage distribution bus may be controllably limited and mitigated. It is a second objective that high, over-current flow, such as could occur into a failed and/or shorted load circuit, and such as could possibly degrade the voltage of the direct current distribution bus, will be protected against. It is a third objective that the inrush current may be limited by the present circuit to any desired level, no matter how low.

It is a secondary goal, of subsidiary importance to the above listed three goals, that the design of the present direct current inrush limiting circuit shall dissipate very little power under normal, quiescent, conditions of current supply from the D.C. voltage distribution bus to the load circuit. In other words, the present direct current inrush limiting circuit is essentially a short circuit when not performing its current limiting function. It is a second subsidiary objective that the present direct current inrush limiting circuit should be conceptually simple, sensing current only and will not be dependent on any special sequences and/or timing, thus allowing it to limit current under the broadest range of time and/or magnitude constraints. It is a third subsidiary objective of the present design of a direct current inrush limiting circuit that such circuit should properly control the distribution of power from a D.C. voltage distribution bus to a load during such time as the D.C. voltage distribution bus is being brought to quiescent level, as during the turn-on of a system. In other words, the present direct current inrush limiting circuit is itself powered by, and integrated into, a system power distribution wherein the present circuit will function correctly during the initiation of (turn-on), or disruption of (turn-off), fundamental power to such system.

When all the above primary and secondary objectives are realized in the direct current inrush limiting circuit of the present invention, it is possible to connect a switching regulator-type D.C. power supply with an input filter possessing considerable capacitance to a direct current voltage distribution bus without the occurrence of a disruptably high inrush currents. Specifically, this means that the sample load of a direct current power supply module with a capacitive input filter can be inserted onto, and withdrawn from, a D.C. voltage distribution bus without arcing, stressed components, and/or undue perturbation to such D.C. voltage distribution bus and without de-energizing such D.C. voltage distribution bus. The present direct inrush current limiting circuit is not limited in its application to control current inrush to such a power supply module load circuit, however, but is of general application for the control of inrush current from any D.C. voltage distribution source to any capacitive load.

BRIEF DESCRIPTION OF THE DRAWINGS

FIG. 2 shows a table describing each component of the circuit of the invention.

DESCRIPTION OF THE PREFERRED EMBODIMENT

Figure 1B:
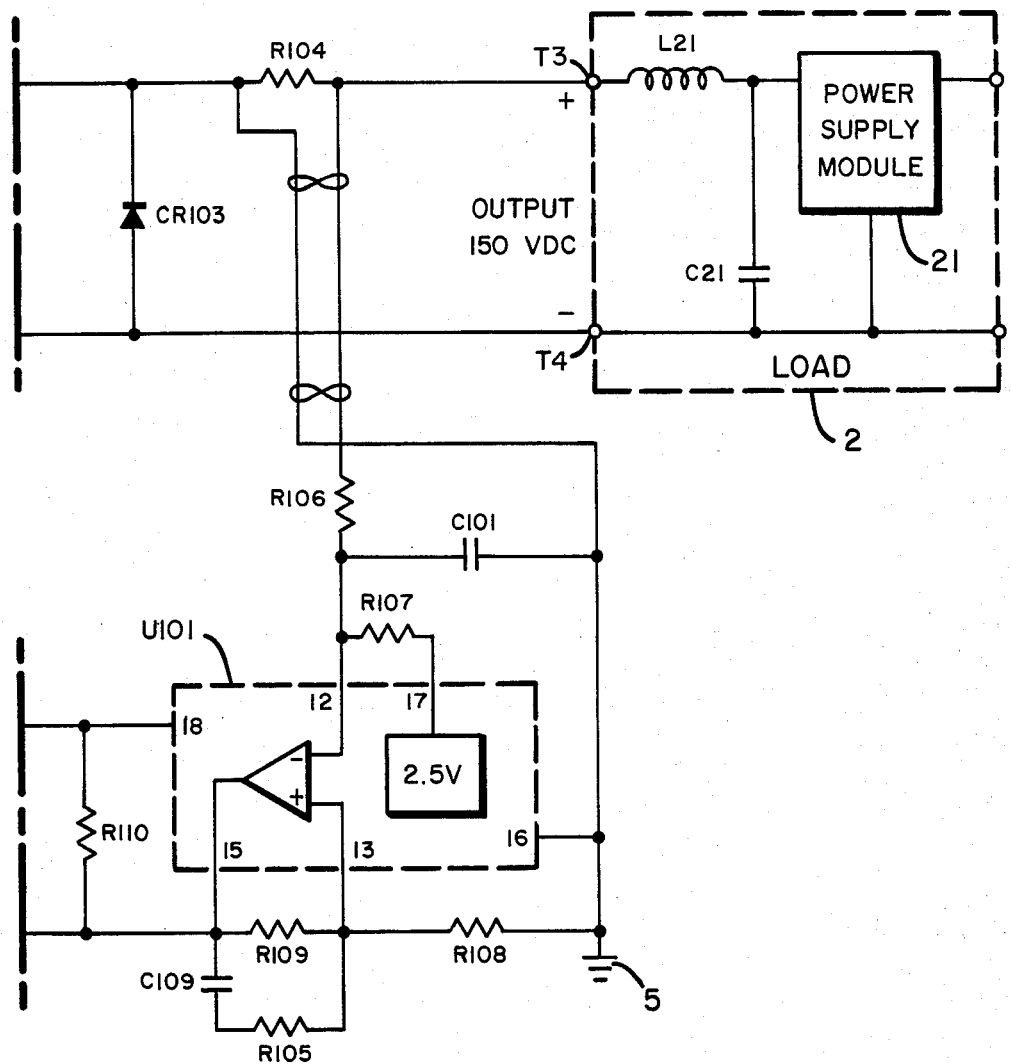
FIG. 1, consisting of FIG. 1a and FIG. 1b, shows the preferred embodiment direct current inrush limiting circuit of the invention.
Figure 1:
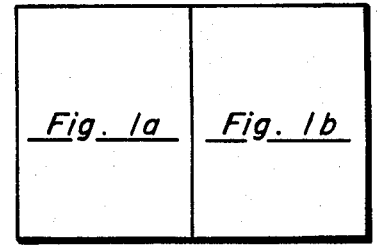
Figure 1A:
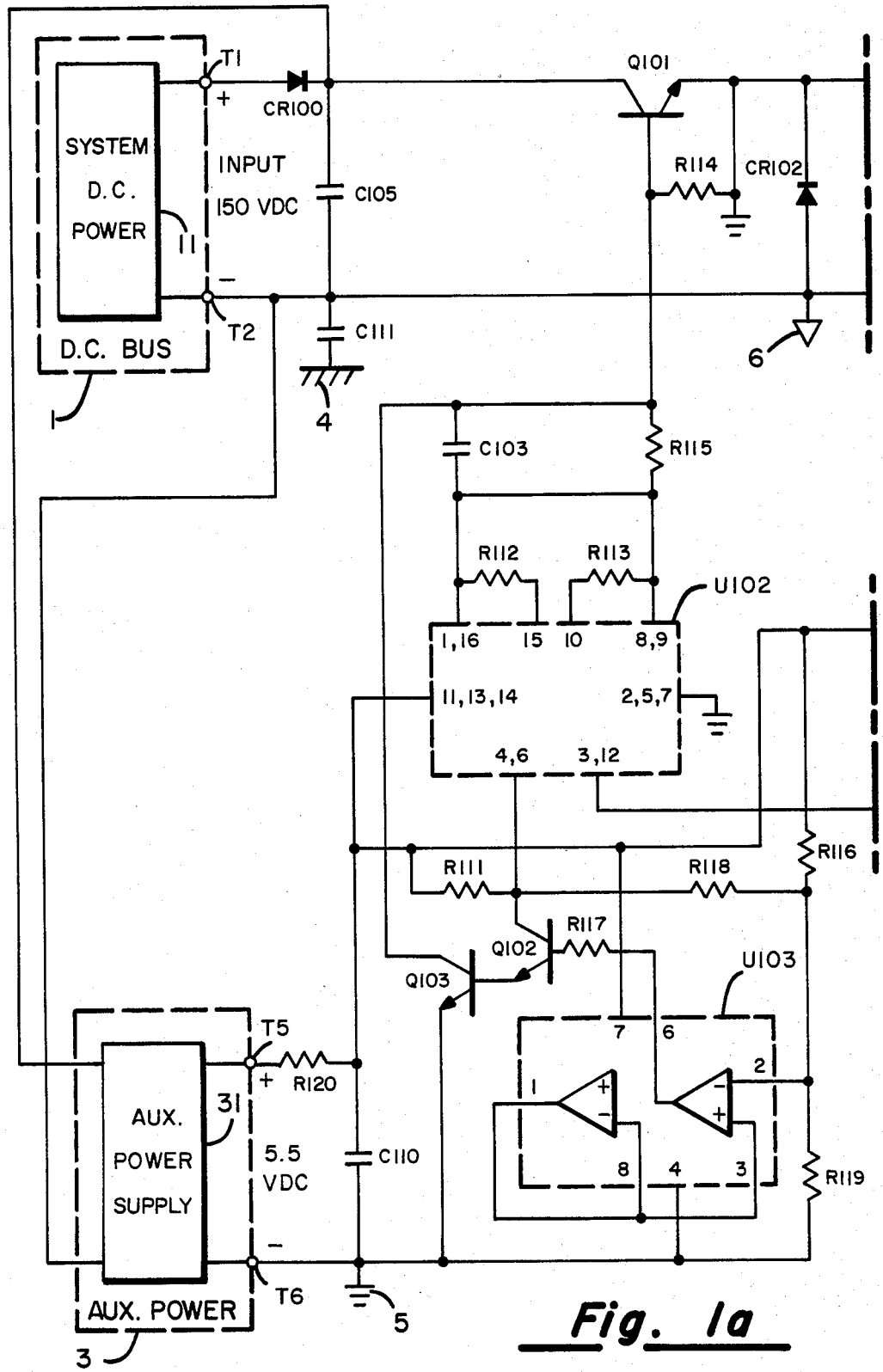

The circuit diagram of the present invention of a direct current inrush limiting circuit is shown in FIG. 1. The source of input current is external element SYSTEM D.C. POWER 11, which is connected as the supply voltage bus D.C. BUS 1 to the present circuit as voltage INPUT 150 VDC between terminals T1 or "+" and T2, or "−". The circuit output labeled OUTPUT 150 VDC between terminals T3, or "+" and T4, or "−", is connected to inductor L21, part of an input filter consisting of inductor L21 and capacitor C21, within LOAD 2, which also contains POWER SUPPLY MODULE 21. So that the current does not rise too rapidly and cause Q101 to switch at too high (e.g. 1 MHz) a frequency, the inductor L21 of the input filter within load 2 must be of at least 0.25 mH. If the direct current flow between INPUT 150 VDC and OUTPUT 150 VDC is below a preset level, for example 5.5 Amps, then series power transistor Q101 is turned-on and saturated. During normal quiescent operation of POWER SUPPLY MODULE 21 within LOAD 2 this is the case (steady state current is below 5.5 Amps). During power-up when the LOAD 2 is first connected (as by insertion) to the D.C. supply bus (between terminals T3 and T4) the input current rises rapidly at a rate determined by the input filter inductor L21.

The performance of the present circuit to limit the inrush of such direct current into LOAD 2 involves four essential elements. There is a means for switchably gating input current flow in the element of series power transistor Q101. There is a means for sensing input current flow in the element of current sensing resistor R104. There is a control loop feedback circuit in the elements of U101 and U102 and associated circuitry for controlling the input current switching accomplished within series power transistor Q101 responsively to the current sensed within current sensing resistor R104. Finally, there is at least one freewheeling diode as is represented by circuit element diode CR102 (CR103) whereby current may be conducted from D.C. BUS 1 to LOAD 2 when the current switching means in the form of series power transistor Q101 is switched off. In the preferred embodiment circuit of the invention shown in FIG. 1 two diodes CR102 and CR103 are shown utilized only for increased current handling capacity.

The top-level, summary, description of the performance of the direct current inrush limiting circuit shown within FIG. 1 is as follows. During the power-up interconnection of LOAD 2, including POWER SUPPLY MODULE 21, to the D.C. supply bus OUTPUT 150 VDC between terminals T3 and T4, the current flow between T1 and T3 rises rapidly. When the current reaches a certain value, nominally 5.5 Amps, the voltage across the sense resistor R104 reaches a threshold value sufficient to enable the comparator circuit based in circuit element U101 and surrounding circuitry to trigger, producing a logical High signal to driver element U102. Such a logically High signal from comparator U101 causes driver element U102 to turn off series power transistor Q101, stopping current flow from terminal T1 to terminal T3. The input filter inductor L21 of LOAD 2 then pulls the emitter of series power transistor Q101 and the cathode(s) of the freewheeling diode(s) CR102 (and CR103) low, thereby turning the diode(s) on. The diode(s) CR102 (and CR103) thus conduct(s) the input current. The input current now falls from its previous high value, nominally, 5.5 Amps, and when it reaches a predetermined lower value, nominally 4.5 Amps, the current sense in resistor R104 will be utilized by comparator circuit element U101 and surrounding circuitry to cause driver element U102 and surrounding circuitry to turn the series power transistor Q101 back on. At this point the diode(s) CR102 (and CR103) turns off. Thus, the current cycles back and forth between two predetermined levels (nominally 5.5 Amps and 4.5 Amps), flowing alternately through series power transistor Q101 and through the freewheeling diode(s) CR 102 (and CR103) until the capacitance C21 of LOAD 2 is fully charged. The input current conducted between terminals T1 and T3 then drops to its normal, quiescent, steady state level (nominally less than 5 Amps.) which is lower than the limit level, at which level the sense of current flow in resistor R104 by comparator circuit U101 and surrounding elements will cause the driver element U102 and surrounding circuitry to maintain series power transistor Q101 in the fully saturated state. Under this normal operational condition, series power transistor Q101 is saturated and dissipates very little power at moderate current levels if a good quality transistor is used. In the circuit shown, series power transistor Q101 consumes only about 0.5 watts, and the entirety of the direct current inrush limiting control circuitry about 1.5 watts, in the presence of a steady state current of 2 to 3 Amps. Thusly series power transistor Q101 is essentially a short circuit when it is not current limiting.

Additional circuit element U103 and surrounding circuitry is used to keep the driver circuit U102 off until the voltage supply to the present direct current inrush limiting circuit between terminals T5 and T6 is at least 5 volts. Such voltage supply, nominally 5.5 VDC between terminals T5, or "+" and T6, or "—" is developed in external AUX POWER SUPPLY 31 part of section AUX POWER 3 responsive to application of input 150 VDC from system D.C. POWER 11 within section D.C. BUS 1. Circuit element U103 and surrounding circuitry will control driver element U102 to prevent series power transistor Q101 from turning on with insufficient base drive and resultantly not saturating fully.

During the following detailed explanation of the direct current inrush limiting circuit as shown in FIG. 1, reference should be had to the table of components within FIG. 2 for the description and/or part number of all circuit components. The direct current inrush limiting circuit shown in FIG. 1 controls the application of D.C. power between terminals T1 and T2, labeled INPUT 150 VDC, to terminals T3 and T4, labeled OUTPUT 150 VDC. It thusly serves to limit the direct current power flow between a direct current source, labeled DC BUS 1, to a direct current power sink, labeled LOAD 2. The LOAD 2 contains a POWER SUPPLY MODULE 21 with an input filter consisting of inductor L21 and a capacitor C21, which capacitor C21 is nominally sizable for a switched-type POWER SUPPLY MODULE 21. Thusly when LOAD 2 is initially connected to OUTPUT 150 VDC between terminals T3 and T4, then the direct current inrush to capacitance C21, and such additional capacitance as is present within POWER SUPPLY MODULE 21, would be very great save for the action of the present direct current inrush limiting circuit. If such connection of LOAD 2 resulting in an inrush current had been via mechanical insertion of a pin connected module, then the pins could be subject to arcing from such a large inrush current. Additionally, such a large inrush current stresses components in the current path, such as diodes and capacitors. Finally, this large current is drawn from SYSTEM D.C. POWER 11 via a system voltage distribution bus labeled INPUT 150 VDC between terminals T1 and T2 and can cause a momentary drop in the voltage of such system distribution bus, thereby potentially adversely affecting other operating system modules utilizing such voltage distribution bus. Finally, the short circuit failure of LOAD 2 can produce a large current inrush with potential degradation of system bus INPUT 150 VDC between terminals T1 and T2, save for the operation of the present direct current inrush limiting circuit.

Continuing in the explanation of the direct current inrush limiting circuit as shown in FIG. 1, diode CR100 serves to protect Q101 from having a destructive reverse voltage across its collector to emitter should the 150 volt D.C. BUS 1 drop to zero volts. This destructive voltage would otherwise be applied to Q101 from Charged capacitor C21. Capacitor C105 filters out induced a.c. noise transients resultant from the switching of series power transistor Q101, and serves to counteract the inductance of the input lines from SYSTEM D.C. POWER 11 within D.C. BUS 1, such lines as may be quite long. Similarly, capacitor C111 also shunts a.c. noise which occurs resultant from switching of series power transistor Q101 to the ground 4 of the chassis in which the present inrush current limiting circuit is installed.

Continuing in FIG. 1, the input current limiting transistor Q101 which, by reference to the parts list of FIG. 2, is a 300 volt, 50 Amp NPN type, is suggested to be type SDT 96306 available from Solitron Devices, Inc., Riviera Beach, Fla. 33404. A prime characteristic exhibited by this device, and such characteristic as should be sought in equivalent devices, is very low power dissipation during saturated mode operation, as well as adequate current handling capacity for the intended application. Resistor R114 is, by reference to the parts list of FIG. 2, a simple 200 ohms, 2% ¼ watt base bias resistor for transistor Q101. Two freewheeling diodes, diodes CR102 and CR103, are utilized in parallel for augmented current capacity. A suggested manufacturer's part number for these diodes, specified to be 300 volts, 5 ampere fast switching type in the parts list of FIG. 2, is Unitrode UES 1305. The characteristic sought is fast switching time with adequate current capacity for the intended application.

Continuing in FIG. 1, and commencing with the detailed functional explanation of the present direct current inrush limiting circuit, resistor R104, specified in the parts list table shown in FIG. 2 to be 20 miliohms 3%, 2 watts, is the current sensing resistor. A particular manufacturer's part number which will suffice for this purpose is Dale part number LVR-2-0.020. Monolithic integrated device U101 is a supervisory chip, type SG1544 low-voltage supervisory circuit available from Silicon General, 11651 Monarch Street, Garden Grove, Calif. 92641. The feature being utilized is one of the three voltage-sensing input comparators available upon this monolithic device. Output pin 17 of this chip U101 provides a 2.50 volt voltage reference, which is divided in a resistive divider consisting of resistance R107 and resistances R106 and R104 for application to the offset comparator circuit at pin 12 of the U101 chip. The resistive values indicated in the parts list table shown in FIG. 2 establish the upper current limit level at approximately 5.5 Amperes. Capacitor C101 is merely a filter which controls the inductance of R104 and associated wiring while moving high frequency transients from the voltage waveform derived across R104, such transients as are due to the switching of current limiting transistor Q101 and freewheeling diodes CR102 (and CR103). The output of the voltage-sensing input comparator of chip U101 will be obtained at pin 15, a voltage which will go logically Low when threshold level current, as sensed in current sensing resistor R104, is reached. Resistances R105 and R109 and capacitance C109 serve as an external adjustment of the natural hysteresis qualities of the voltage-sensing input comparator within the U101 monolithic circuit chip. Specifically, resistance R109 provides d.c. hysteresis upon turning on and off current regulating transistor Q101, and the series resistance R105 and capacitance C109 provides a.c. hysteresis when switching current limiting transistor Q101. The d.c. hysteresis makes that current regulating transistor Q101 will not be switched for small deviations of short duration in the direct current sensed by current sensing resistor R104. The a.c. hysteresis accounts for a.c. noise, or ringing, on the twisted pair transmission lines connecting current sensing resistor R104 and the offset comparator of the U101 chip.

When the current flow between terminal T1 and terminal T3 reaches approximately 5.5 Amperes, the voltage across sense resistor R104 reaches a threshold which causes voltage comparator chip U101 to output a logical High voltage on pin 15. Conversely, during less than threshold current flow, the voltage at pin 15 of chip U101 will be maintained at the 0 volts D.C. the logical High, plus 2.5 volt D.C. derived from U101 because U101 has an open collector output, and Low, 0 volt D.C. which is driven by U101, voltages at pin 15 of voltage comparator chip U101 will respectively cause driver chip U102 to turn series current limiting transistor Q101 off and on. Driver chip U102 is type SG1627 available from Silicon General. It is a monolithic, high speed integrated driver circuit interfacing low-level logic signals with high current loads. An inverted input control signal accepted at pins 3, 12 of chip U102 is passed through two parallel totem pole drivers to control a drive between source pins 10 and 15 sink pins 1 and 8. Pins 4, 6 are the non-inverting inputs which are maintained at a logical High, +25 v.d.c., during the normally powered condition. The utilization by providing an a.c. pulse of short duration when the signal at U101 pin 15 switches, thereby assuring that such switching should transpire with certainty and will not vacillate between the on and off switched states. Resistances R112 and R113 are drive current limiting resistors which limit maximum peak current to approximately one ampere. The voltage across R112 and R113 is respectively sensed at pins 16 and 9 (tied to pins 1 and 8 outside chip U102) to provide this current limiting. Resistance R115 sets the quiescent current drive d.c. level as applied to the base of series current limiting transistor Q101. Capacitance C103 stores charge which helps for the turn on and turn off of series current limiting transistor Q101. The performance of the present feedback circuit consisting of voltage comparator chip U101 and driver chip U102 in effecting control of direct current inrush from D.C. BUS 1 through series power regulating transistor Q101 will be further reviewed in conjunction with FIG. 3 and FIG. 4.

Continuing in FIG. 1, the operational amplifier and voltage reference chip U103 are utilized to keep the driver chip U102, and correspondingly series input current limiting transistor Q101, off until the external voltage power supply to chips U101 and U102 reaches approximately 5 volts. This power, the power utilized by the present direct inrush current limiting circuit, is developed in AUX. POWER SUPPLY 31 part of AUX. POWER 3 from a tap of what is essentially D.C. BUS 1 at terminals T1 and T2, thereby the input power of INPUT 150 VDC. The nominal voltage developed in AUX. POWER 3 is 5.5 VDC as appears between terminals T5 and T6. As filtered by resistor R120 and capacitor C110, this nominal 5.5 VDC power is distributed to pins 11, 13, 14 of driver chip U102, pin 18 of voltage comparator U101, and pin 7 of the operational amplifier and voltage reference chip U103. Similarly, the ground level available at terminal T6 is distributed as ground 5 to pins 2, 5, 7 of driver chip U102, pin 16 of comparator chip U101 and to pin 4 of operational amplifier and voltage reference chip U103. The operational amplifier and voltage reference chip U103 is chosen as type LM10 available from National Semiconductor Corporation, 2900 Semiconductor Drive, Santa Clara, Calif. 95051 for being operative at very low supply voltages, rated to be as low as 1.1 volt D.C.

During the initial application of system D.C. POWER 11 through D.C. BUS 1 as voltage input 150 VDC between terminals T1 and T2, and the resultant development therefrom in AUX. POWER SUPPLY 31 part of AUX. POWER 3 of voltage 5.5 VDC between terminals T5 and T6, the operational amplifier and reference chip U103 and surrounding circuitry will serve to keep series input current limiting transistor Q101 off. This is because operational amplifier and voltage reference chip U103 will assume normal operation at a very low input voltage, approximately 1.1 volt D.C., producing a logical High output on pin 6 which, as transferred through base bias resistance R117, will cause transistors Q102 and Q103 to turn on when the auxiliary power reaches about 1.5 v.d.c. Thus pins 4 and 6 of U102 will be held at about 0.8 v.d.c. by the collector of Q102, transistor Q103 causes such transistor to turn on, causing the collector of transistor Q103 and the base of series input current limiting transistor Q101 to become approximately 0 volts D.C. This means that the present direct current inrush limiting circuit will not allow current to be conducted from D.C. BUS 1 to LOAD 2 during the initialization of system D.C. POWER 11. Resistances R116 and R119 constitute a voltage divider to accomplish control of operational amplifier and voltage reference chip U103. The bias so established will cause a logical High signal to be output from operational amplifier and voltage reference chip U103 on pin 6 until approximately 5.2 volts D.C. is reached between terminals T5 and T6 during the initiation of power. Resistance R118 adds hysteresis characteristics, meaning that the operational amplifier and voltage reference chip U103 will maintain a logically High condition at pin 6 until approximately 4.5 volts D.C. is reached between terminals T5 and T6 during the disruption of power. When the logical Low, approximately 0 volt D.C., signal level is obtained at pin 6 of operational amplifier and voltage reference chip U103, then transistors Q102 and Q103 will be turned off applying a logical High to the pins 4, 6 of the driver chip U102, and also allowing series power transistor Q101 to turn on. Thusly there will be no effect on the base drive circuit of series power transistor Q101 from this circuitry concerning power initialization and power disruption during the quiescent operational state.

Figure 3:
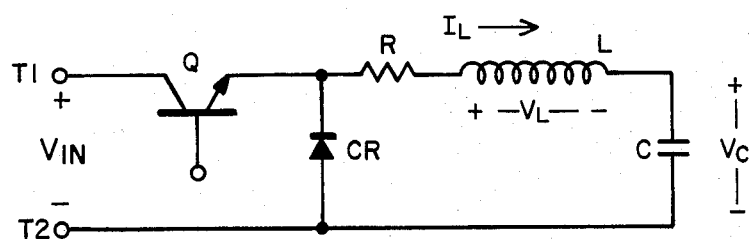
FIG. 3 shows a simplified electrical schematic of the circuit of the invention.

Preparatory to analyzing the response of the direct current inrush limiting circuit of FIG. 1 within FIG. 4, the simplified electrical schematic diagram of the direct current inrush limiting circuit and LOAD 2 (reference to FIG. 1) is shown in FIG. 3. Obviously, $V_{IN}$ between terminals T1 and T2 corresponds to INPUT 150 VDC shown in FIG. 1, and transistor Q corresponds to transistor Q101 shown in FIG. 1. Similarly, diode CR corresponds to CR102 and CR103 shown in FIG. 1, and R corresponds to resistor R104 shown in FIG. 1. Inductance L corresponds to inductor L21 plus any inductance possessed by POWER SUPPLY MODULE 21 within LOAD 2 shown in FIG. 1. Similarly, capacitance C corresponds to capacitor C21 plus any capacitance exhibited by POWER SUPPLY MODULE 21 within LOAD 2 shown in FIG. 1. Under the physical law relating voltage, inductance, and current flow, the voltage $V_L$ seen across inductance L equals times $\Delta I_L$ divided by $\Delta t$, or $V_L$ equals $L \cdot \Delta I_L / \Delta t$.

Figure 4A:
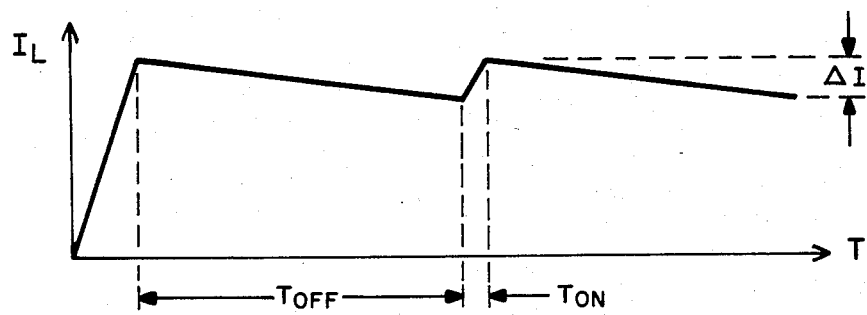
FIG. 4, consisting of FIG. 4a through FIG. 4c, show in time sequence the direct inrush current as controlled by the circuit of this invention.
Figure 4B:
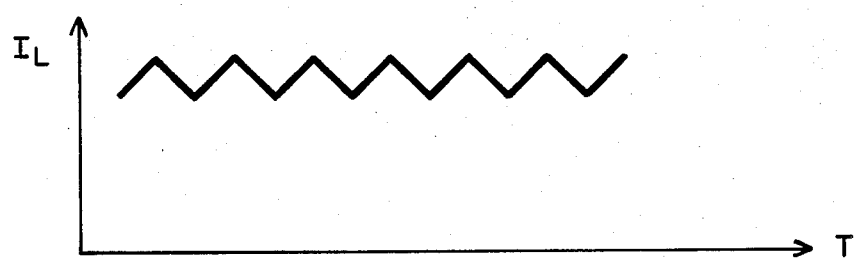
Figure 4C:
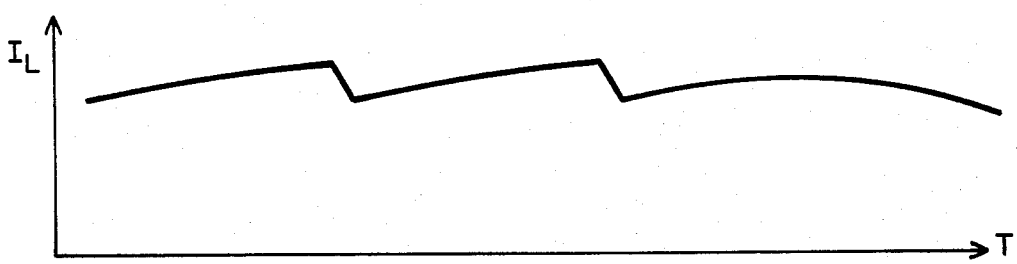

The current flow $I_L$ shown in FIG. 3, such current flow as is into LOAD 2 shown in FIG. 1, is diagrammed in FIG. 4a through FIG. 4c for the initial, midway and final period of the application of LOAD 2 to D.C. BUS 1 via the direct current inrush limiting circuit. Commencing in FIG. 4a, and referencing also FIG. 3, initially $V_C$, being the voltage across capacitance C, is very small. Since the input voltage $V_{IN}$, is approximately equal to $V_L$ plus $V_C$ where the forward voltage drop across transistor Q and low ohmage resistor R is small, then $V_L$ is initially large during $T_{ON}$. By the mathematical relationship that $T_{ON}$ equals $\Delta I_L \cdot L / V_L$ ON, the $T_{ON}$ is of short duration. It is so illustrated in FIG. 4a. Correspondingly, $T_{OFF}$ equals $\Delta I_L \cdot L / V_L$ OFF, or since $V_L$ is small during $T_{OFF}$, $T_{OFF}$ is long. This is also illustrated in FIG. 4a, which figure illustrates the current flow $I_L$ during an initial period. In the relationship, $\Delta I_L$ ON = $\Delta I_L$ OFF, the magnitude of both of which is set by hysteresis resistors (R108 and R109 shown in FIG. 1) in the control circuitry.

The current $I_L$ halfway through the charging period is represented in FIG. 4b. The timeline, T, shown in FIG. 4b is but a continuation of that shown in FIG. 4a, FIG. 4b simply representing a later, halfway period. Halfway through the charging period, capacitor C is charged to half the input voltage, $V_C$ equals $\frac{1}{2} V_{IN}$, so that the voltage across L is the same during $T_{ON}$ and $T_{OFF}$. Thus, by the relationship that $T_{ON}$ equals $\Delta I_L \cdot L / V_L$ ON, and $T_{OFF}$ equals $\Delta I_L \cdot L / V_L$ OFF, $T_{ON}$ equals $T_{OFF}$. (As before, $I_L$ ON = $I_L$ OFF). Furthermore, $T_{ON}$ plus $T_{OFF}$ will be a combined minimum, so that the switching frequency of transistor Q is a maximum.

Current flow $I_L$ during the final period of charging capacitance C through the direct current inrush limiting circuit is illustrated in FIG. 4c. The timeline, T, of FIG. 4c is but a continuation of the same timeline T as was illustrated in FIG. 4a and FIG. 4b. The current $I_L$ in the final period may be observed to be the reverse of the current $I_L$ within the initial period. Period $T_{ON}$ is very long and $T_{OFF}$ is short because capacitance C is almost fully charged. At a final time, the current will never meet the maximum, shutoff, level and the transistor Q will stay on indefinitely because capacitance C is fully charged. The total time duration from initial load connection illustrated in FIG. 4a through final quiescent current flow illustrated in FIG. 4c is determined by the total amount of capacitance in LOAD 2, the input voltage being charged to (herein +150 v.d.c.), and by the nominal current limit level (herein 5.5 amperes as adjusted by R107 and R104). For example for typeical capacitance of LOAD 2 equalling 500 microfarads, charging time of C21 = C·ΔV/I = 500 microfarads·150 v.d.c./5 amperes = 15 milliseconds.

While a specific preferred embodiment of the invention has been described in detail in conjunction with a particular LOAD 2 containing a POWER SUPPLY MODULE 21 (shown in FIG. 1), it will be understood that the basic principles of the invention may be utilized for the direct current inrush control to capacitive loads of all natures. Furthermore, although the invention has been particularly shown and described with reference to the preferred embodiment thereof, it will be understood by those skilled in the art that various alterations in form and detail may be made therein without departing from the spirit and scope of the invention. For example, a Hall effect device could be utilized for current sensing means, another threshold comparator circuit other than chip type SG1544, and an alternative driver circuit other than that implemented within chip type SG1627 could be accomplished, and either the current limit level (nominally 5 amperes) and input d.c. voltage (nominally 150 v.d.c.) could be different.

What is claimed is:

1. A circuit for controlling the inrush of direct current from a supply voltage upon connection to an uncharged capacitive load, said circuit comprising:

series current regulating means for, responsively to a control signal, regulating the direct current flow from said supply voltage to said capacitive load;

series current sensing means at the connection of said supply voltage to said capacitive load for developing a sense signal proportional to the direct current flow from said supply voltage to said capacitive load;

feedback loop control means for, resonsively to said sense signal, developing said control signal so as to cause said series current regulating means to cyclically oscillate from conduction to non-conduction of said direct current flow until such time as said capacitive load is substantially fully charged whereupon said control signal is developed so as to cause said series current regulating means to conduct a normal, quiescent, current flow;

freewheeling diode means, in parallel with said capacitive load, for and so oriented for, conducting current into said load when said series current regulating means are non-conducting of said direct current flow from said supply voltage to said capacitive load while not conducting any appreciable current when said normal, quiescent, current flow is obtained;

means for ensuring that when the circuit is supplied with insufficient voltage for reliable correct operation then said series current regulating means will be maintained non-conductive of said direct current flow from said supply voltage to said capacitive load; and wherein said capacitive load is possessed of at least such small series inductance as will preclude that direct current conducted by said series current regulating means from said supply voltage to said capacitive load should increase so essentially instantaneously that said feedback loop control means responsive to said series current sensing means should not have sufficient time to respond for control of said series current regulating means, and such as will ensure that some current should flow to said load through said freewheeling diode means when said series current regulating means are non-conducting;

whereby said direct current from said voltage supply to said capacitive load does flow alternately through said series current regulating means and said freewheeling diode means in charging said capacitive load;

whereby said direct current inrush upon connection of a supply voltage to an uncharged capacitive load is limited;

whereby if said circuit is unpowered or underpowered its operation is to isolate said capacitive load from said supply voltage.

2. The direct current inrush limiting circuit of claim 1 which further comprises:

means for powering said circuit from, and with proportional respect to the voltage level of, said supply voltage; and means for ensuring, responsively connected to said means for powering proportional to said supply voltage, that when said supply voltage is insufficient for either charging said capacitive load, or is insufficient for providing such voltage level to said means for powering as will enable the reliable operation of said direct current inrush limiting circuit, or is insufficient for both purposes then said series current regulating means will be maintained non-conductive, isolating said capacitive load from said supply voltage, until and unless said supply voltage does assume, or resume, a sufficient level;

whereby said direct current inrush limiting circuit is responsive to said supply voltage for not conducting said direct current, isolating said capacitive load from said supply voltage, when said supply voltage is below sufficient level, as upon initiation or failure, to charge said capacitive load;

whereby said direct current inrush limiting circuit is also responsive to said supply voltage for not operating, isolating said capacitive load from said supply voltage, when said direct current inrush limiting circuit is itself insufficiently powered;

whereby functionality correctly isolating the load from the supply is maintained by said direct current inrush limiting circuit during insufficiency of said supply voltage for any purpose.

3. The direct current inrush limiting circuit of claim 1 wherein said series current regulating means comprises a semiconductor of adequate peak said direct current handling capacity which further exhibits very low forward resistance when conducting;

whereby said very low forward resistance when conducting means that said series current regulating means consume only low power when said normal, quiescent current is conducted.

4. The direct current inrush limiting circuit of claim 4 wherein said series current regulating means further comprises:

a transistor capable of conducting at least 5.5 amperes peak said direct current while dissipating less than 1 watt during the presence of a normal, quiescent current of up to 3 amperes.

5. The direct current inrush limiting circuit of claim 1 wherein said series current sensing means further comprises:

a resistor.

6. The direct current inrush limiting circuit of claim 6 wherein said feedback loop control means further comprises:

feedback loop control means with components constituting, in conjunction with said resistor of said series current sensing means, a voltage divider network which, by selection of said components, is adjustable to establish a range of peak currents which will be conducted by said series current regulating means prior to said oscillation, under control of said feeback loop control means, from conduction to non-conduction.

7. The direct current inrush limiting circuit of claim 1 wherein said feedback loop control means further comprise:

feedback loop control means with components selectable to provide direct current hysteresis in said control signal causing said oscillating from non-conduction to conduction, and causing said oscillating from conduction to non-conduction, of said series current regulating means;

whereby said direct current hysteresis of said feedback loop control means in the control of said series current regulating means does cause that said series current regulating means should not be switched for small deviations of short duration in said direct current as sensed by said series current sensing means.

8. The direct current inrush limiting circuit of claim 1 wherein said feedback loop control means further comprise:

feedback loop control means with components selectable to provide alternating current hysteresis in said control signal causing said oscillating from non-conduction to conduction, and causing said oscillating from conduction to non-conduction, of said series current regulating means;

whereby said alternating current hysteresis of said feedback loop control means in the control of said series current regulating means does cause that said series current regulating means will be switched with positive certainty and without vacillating between conducting and non-conducting states.

* * * * *

UNITED STATES PATENT AND TRADEMARK OFFICE
CERTIFICATE OF CORRECTION

PATENT NO. : 4,494,064
DATED : January 15, 1985
INVENTOR(S) : John C. Harkness

It is certified that error appears in the above-identified patent and that said Letters Patent is hereby corrected as shown below:

Column 12, Line 39, the second "4" should be -- 3 -- .

Column 12, Line 51, the second "6" should be -- 5 -- .

Column 12, Line 61, "feeback" should be -- feedback -- .

Signed and Sealed this

Eighteenth Day of June 1985

[SEAL]

Attest:

DONALD J. QUIGG

Attesting Officer     Acting Commissioner of Patents and Trademarks